(12) United States Patent
Chen et al.

(10) Patent No.: US 6,842,518 B2
(45) Date of Patent: Jan. 11, 2005

(54) FREQUENCY-DEPENDENT IMPEDANCE SYNTHESIS FOR DSL INTERFACE CIRCUITS

(75) Inventors: Robert K. Chen, North Andover, MA (US); John C. Gammel, Birdsboro, PA (US); Dewayne A. Spires, Plaistow, NH (US)

(73) Assignee: Legerity, Inc., Austin, TX (US)

( * ) Notice: Subject to any disclaimer, the term of this patent is extended or adjusted under 35 U.S.C. 154(b) by 361 days.

(21) Appl. No.: 10/017,883

(22) Filed: Dec. 13, 2001

(65) Prior Publication Data

US 2003/0112962 A1 Jun. 19, 2003

(51) Int. Cl.[7] .............................................. H04M 7/04
(52) U.S. Cl. ................................. 379/398; 379/399.01
(58) Field of Search ............................ 379/93.05, 398, 379/399.01, 402, 403, 404, 405

(56) References Cited

U.S. PATENT DOCUMENTS

| | | | |
|---|---|---|---|
| 3,855,431 A | * 12/1974 | Stewart | 379/405 |
| 3,867,589 A | * 2/1975 | Junek | 379/4 |
| 4,823,383 A | 4/1989 | Cardot et al. | 379/399.01 |
| 4,899,382 A | 2/1990 | Gartner | 379/399.01 |
| 6,137,880 A | 10/2000 | Bella | 379/399.01 |
| 6,295,343 B1 | 9/2001 | Hjartarson et al. | 379/399.01 |
| 6,418,221 B1 | * 7/2002 | Snow et al. | 379/399.01 |
| 2002/0181697 A1 | 12/2002 | Bolla et al. | 379/399.01 |

* cited by examiner

Primary Examiner—Xu Mei
Assistant Examiner—Walter F. Briney, III
(74) Attorney, Agent, or Firm—Steve Mendelsohn; Yuri Gruzdkov

(57) ABSTRACT

An impedance warping circuit (IWC) and technique for compensating the effect of a blocking capacitor within a transformer of an interface circuit for passing plain old telephone service (POTS) band and asynchronous digital subscriber line (ADSL) band signals on signals having frequencies in the POTS band. The IWC does not significantly affect the performance of the interface circuit in the ADSL band. The IWC synthesizes impedance to compensate the frequency-dependent deviation in the termination impedance across the tip/ring lines. The resulting termination impedance may be designed to conform to the Telcordia Standard of 900 $\Omega$+2.16 $\mu$F or other telecommunication standards throughout the entire POTS band.

22 Claims, 6 Drawing Sheets

FREQUENCY-DEPENDENT IMPEDANCE SYNTHESIS FOR DSL INTERFACE CIRCUITS

BACKGROUND OF THE INVENTION

1. Field of the Invention

The present invention relates to the field of telecommunications and, more specifically, to telecommunication electronics.

2. Description of the Related Art

FIG. 1 illustrates a telephone service arrangement between a subscriber 10 (e.g., residential or commercial telephone customer) and a service provider 12 that exchanges data with a telephone company central office (TCCO) 14 to provide telephone service to subscriber 10. There are many telecommunication standards that service provider 12 should comply with to insure compatibility between telecommunication devices at subscriber 10 and service provider 12.

One of the standards with which service provider 12 should comply is the Telcordia Standard TR-NWT-000057 (referred to herein as the "Telcordia Standard"), which specifies the impedance level a telecommunication device at subscriber 10 should encounter when a connection is established with service provider 12. According to the Telcordia Standard, this impedance level is 900 ohms ($\omega$)+2.16 microfarads ($\mu$F) as viewed by subscriber 10 between the tip line 16 and ring line 18 (referred to herein as the tip/ring lines 20). Telecommunication devices for use at subscriber 10 are designed based on the impedance level set forth in the Telcordia Standard and, therefore, if the impedance of tip/ring lines 20 deviates from this standard, telephone service may be affected adversely.

In traditional audio only telephone service arrangements (i.e., plain old telephone service, "POTS"), a subscriber line interface circuit (SLIC) 22 and a coder/decoder (CODEC) 24 generate a suitable impedance level between tip/ring lines 20. CODEC 24 develops a signal based on an output from SLIC 22 at ports VTX and VRTX that reflects current sensed by SLIC 22 at protected tip (PT) port and protected ring (PR) port. The developed signal can be fed back to tip/ring lines 20 via CODEC output ports VRN and VRP and further via SLIC ports PT and PR to synthesize an impedance that complies with the Telcordia Standard, i.e., 900 $\Omega$+2.16 $\mu$F. In a typical arrangement, SLIC 22 receives the signal from CODEC 24 through a non-inverting receive AC signal input (RCVP) and an inverting receive AC signal input (RCVN).

Recently, asynchronous digital subscriber line (ADSL) has become a common standard for transferring data at a very high rate between subscriber 10 and TCCO 14. ADSL service is provided over the same tip/ring lines 20 as POTS. The ADSL signals are transmitted in a frequency band above about 25 kHz, whereas traditional POTS signals are transmitted in a frequency band below about 4 kHz.

FIG. 2 illustrates an interface circuit 200 within service provider 12 of FIG. 1 for separating ADSL and POTS signals received from subscriber 10 for transmission to TCCO 14, and combining ADSL and POTS signals received from TCCO 14 for transmission to subscriber 10. Interface circuit 200 of FIG. 2 adds a transformer 26, which contains a blocking capacitor 28, to the service arrangement of FIG. 1. Ideally, transformer 26 exhibits low impedance to signals in the ADSL band. Blocking capacitor 28 is selected to prevent low frequency signals (e.g., signals in the POTS band) from passing through transformer 26, thereby creating a "pure" ADSL signal for processing by ADSL circuitry 30 at service provider 12. In addition, a low-pass filter (LPF) 32, which contains a coupled inductor 34 and a capacitor 36, is added to filter out signals in the ADSL band, thereby creating a "pure" POTS signal for processing by SLIC 22 and CODEC 24. A first resistor 38 is coupled between the PT port of SLIC 22 and LPF 32 and a second resistor 40 is coupled between the PR port of SLIC 22 and LPF 32 to provide protection for SLIC 22. Also, a first protection circuit 42 and a second protection circuit 44 are coupled between SLIC 22 and tip/ring lines 20 to protect SLIC 22 from voltage spikes created by coupled inductor 34 of LPF 32.

A problem that arises when transformer 26 containing blocking capacitor 28 is inserted into the traditional POTS circuitry is that, at higher frequencies of the POTS band, e.g., above about 2 kHz, blocking capacitor 28 begins to pass AC current. Because current begins to flow through blocking capacitor 28 at these frequencies, the impedance of tip/ring lines 20 is essentially the impedance developed by CODEC 24 and SLIC 22 in parallel with the impedance of blocking capacitor 28. (The impedance through the windings of transformer 26 is essentially zero at these frequencies.) This reduces the impedance of tip/ring lines 20 at these higher POTS band frequencies, thereby adversely affecting the quality of the POTS.

Accordingly, methods and/or circuits are needed to compensate for the blocking capacitor's effect on impedance for signals having frequencies in the POTS band, while not adversely affecting the impedance for signals having frequencies in the ADSL band.

SUMMARY OF THE INVENTION

The present invention provides an impedance warping circuit (IWC) and technique for compensating the effect of a blocking capacitor within a transformer of an interface circuit for passing POTS band and ADSL band signals, on signals having frequencies in the POTS band. The IWC does not significantly affect the performance of the interface circuit in the ADSL band. The IWC synthesizes impedance to compensate the frequency-dependent deviation in the termination impedance across the tip/ring lines. The resulting termination impedance conforms to, e.g., the Telcordia Standard of 900 $\Omega$+2.16 $\mu$F throughout the entire POTS band. The IWC can be implemented using very few circuit components, such as two operational amplifiers.

According to one embodiment, the present invention is an interface circuit for interfacing between a pair of subscriber tip/ring lines and a central office of a telecommunications network, the interface circuit comprising: (a) filter circuitry configured to separate low-frequency and high-frequency signals appearing on the tip/ring lines, wherein the filter circuitry comprises a blocking capacitor that affects the low-frequency impedance of the tip/ring lines; (b) high-frequency interface circuitry configured to process the high-frequency signals; and (c) low-frequency interface circuitry configured to process the low-frequency signals, wherein the low-frequency interface circuitry comprises: (1) a subscriber line interface circuit (SLIC) configured between the tip and ring lines; (2) a coder/decoder (CODEC) configured to encode and decode the low-frequency signals; and (3) an IWC configured between the SLIC and the CODEC, wherein the IWC tends to compensate for the effect of the blocking capacitor on the low-frequency impedance between the tip/ring lines.

According to another embodiment, the present invention is an IWC for an interface circuit for interfacing between a pair of subscriber tip/ring lines and a central office of a telecommunications network, the interface circuit comprising: (a) filter circuitry configured to separate low-frequency and high-frequency signals appearing on the tip/ring lines, wherein the filter circuitry comprises a blocking capacitor that affects the low-frequency impedance of the tip/ring lines; (b) high-frequency interface circuitry configured to process the high-frequency signals; and (c) low-frequency interface circuitry configured to process the low-frequency signals, wherein the low-frequency interface circuitry comprises: (1) a subscriber line interface circuit (SLIC) configured between the tip and ring lines; (2) a coder/decoder (CODEC) configured to encode and decode the low-frequency signals; and (3) the IWC configured between the SLIC and the CODEC, wherein the IWC tends to compensate for the effect of the blocking capacitor on the low-frequency impedance between the tip/ring lines.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The description herein is largely based on a particular interface circuit for passing POTS band and ADSL band signals for the Telcordia Standard. Those skilled in the art can appreciate that the description can be equally applied to other interface circuits and/or other standards.

Figure 1:
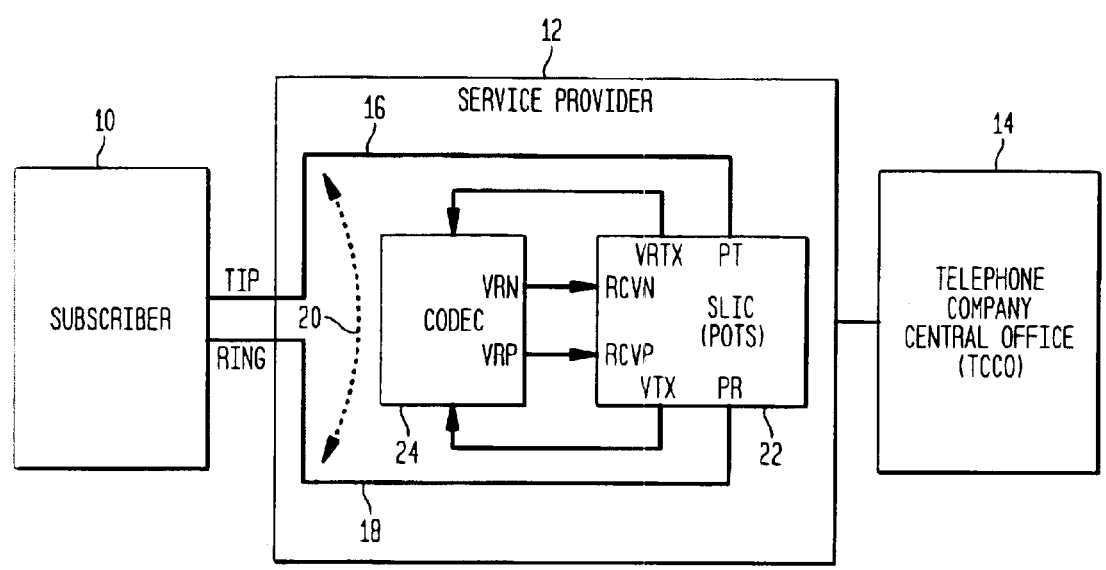
FIG. 1 is a schematic block diagram of a prior art telephone service arrangement.
Figure 2:
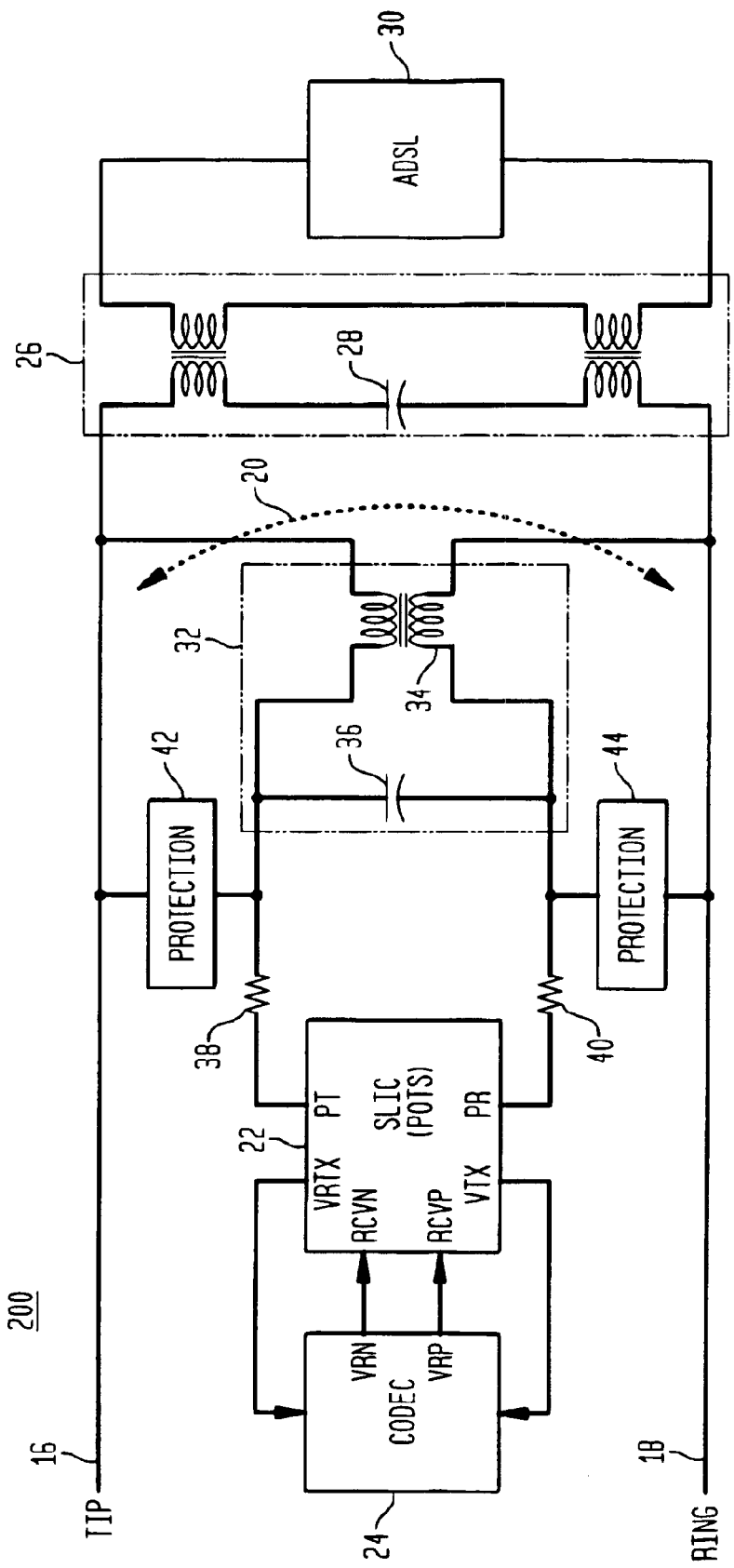
FIG. 2 is a schematic block diagram of an interface circuit for passing POTS band and ADSL band signals.
Figure 3:
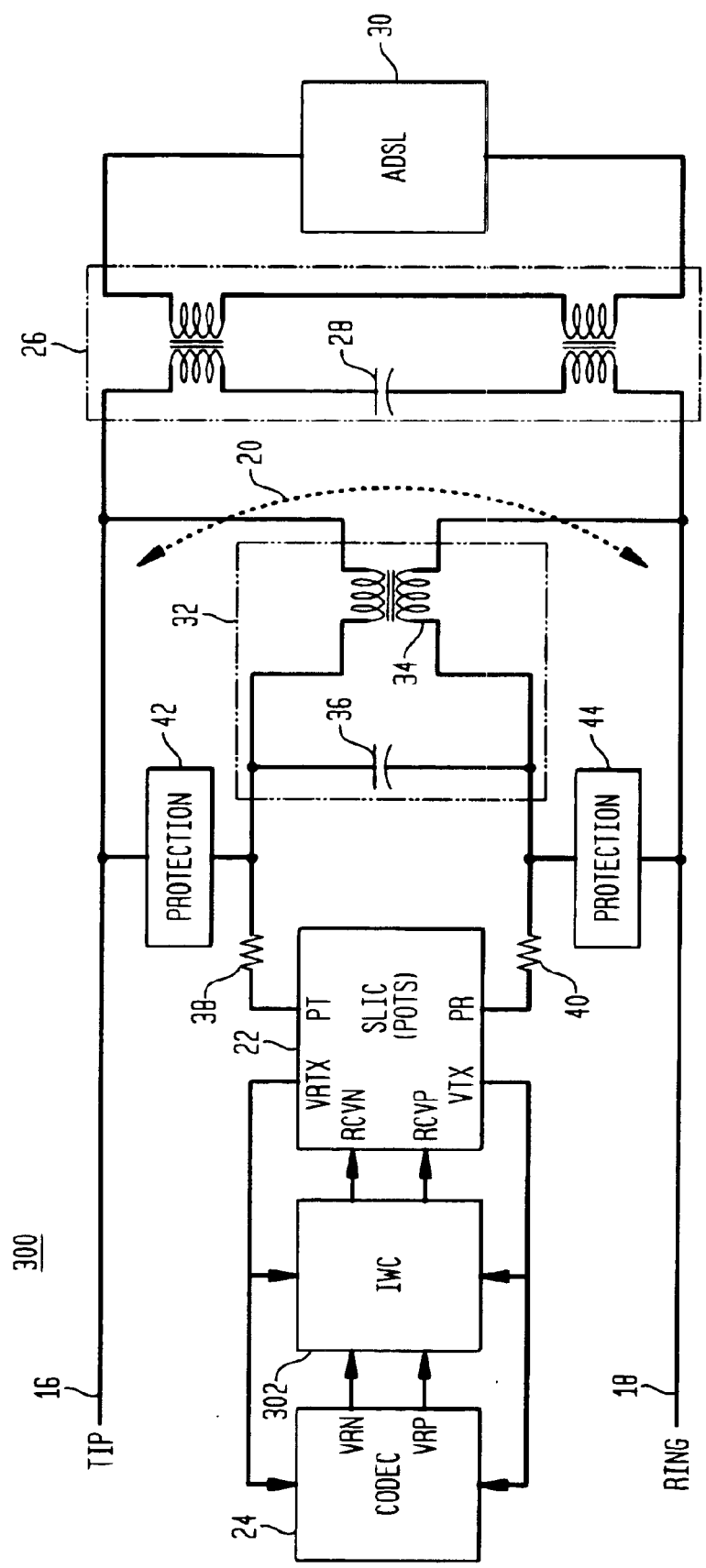
FIG. 3 is a schematic block diagram of an interface circuit for passing POTS band and ADSL band signals having an impedance warping circuit according to one embodiment of the present invention.

FIG. 3 shows a schematic block diagram of an interface circuit 300 for use at service provider 12 of FIG. 1 according to one embodiment of the present invention. Interface circuit 300 is similar to interface circuit 200 of FIG. 2. However, in its impedance generating circuitry, interface circuit 300 incorporates an impedance warping circuit (IWC) 302 connected to SLIC 22 and CODEC 24. CODEC 24 and IWC 302 are configured to synthesize impedance on tip/ring lines 20 complying with the Telcordia Standard. SLIC 22 is configured to interface CODEC 24 and IWC 302 with tip/ring lines 20.

During operation of interface circuit 300, transformer 26 passes signals having frequencies that are above a predetermined frequency to ADSL circuitry 30 and prevents signals having frequencies below this predetermined frequency from passing to ADSL circuitry 30. Transformer 26 includes blocking capacitor 28, which acts as an open circuit for signals having frequencies below the predetermined frequency, thereby preventing these signals from passing through transformer 26 to ADSL circuitry 30. At frequencies near the predetermined frequency, however, blocking capacitor 28 begins to pass current, thereby reducing the impedance between tip/ring lines 20.

In one embodiment, blocking capacitor 28 is selected to allow transformer 26 to pass signals having a frequency above about 4 kHz for processing by ADSL circuitry 30. Since ADSL signals have frequencies above about 25 kHz and POTS signals have frequencies below about 4 kHz, transformer 26 in this embodiment substantially allows only the ADSL signals to pass through to ADSL circuitry 30. However, blocking capacitor 28 will begin to pass current in the upper POTS frequency band at frequencies near 4 kHz e.g., above about 2 kHz for a 33-nF blocking capacitor.

Low-pass filter (LPF) 32 passes signals having frequencies that are below a predetermined frequency and prevents signals having frequencies above this predetermined frequency from passing. In the illustrated embodiment, LPF 32 is coupled between tip line 16 and ring line 18. In addition, LPF 32 is coupled to CODEC 24 and IWC 302 through SLIC 22. In one embodiment, LPF 32 includes a coupled inductor 34 and a capacitor 36. Coupled inductor 34 and capacitor 36 are selected in a known manner to block signals having frequencies above the predetermined frequency and pass signals having frequencies below that frequency. In one embodiment, signals in the ADSL frequency band, e.g., above about 25 kHz, are blocked, while signals in the POTS frequency band, e.g., below about 4 kHz, are allowed to pass for processing by CODEC 24, IWC 302, and SLIC 22.

SLIC 22 is a subscriber line interface circuit. In the embodiment illustrated in FIG. 3, SLIC 22 couples CODEC 24 and IWC 302 to tip/ring lines 20 through LPF 32. Applying a differential current to ports PT and PR of SLIC 22 results in a single-ended signal proportional to the differential current being output at port VTX. A signal applied on either the RCVN or RCVP ports of SLIC 22 results in a differential voltage signal at ports PT and PR that can be used to generate a differential voltage between tip/ring lines 20.

In one embodiment, SLIC 22 senses the current of tip/ring lines 20 through the PT and PR ports coupled to tip/ring lines 20 through a pair of resistors 38 and 40, protection circuits 42 and 44, and LPF 32. Port VTX of SLIC 22 is coupled to CODEC 24 and IWC 302 for passing an output signal proportional to the difference in current between tip/ring lines 20. Port VRTX of SLIC 22 is also coupled to CODEC 24 and IWC 302 for providing a voltage reference (preferably one half of the power supply voltage) for circuitry components within CODEC 24 and IWC 302. Ports RCVN and RCVP of SLIC 22 are coupled to the output of IWC 302 to receive signals generated by IWC 302. SLIC 22 may be a L7585F Full-Feature, Low-Power SLIC and Switch available through Lucent Technologies, Inc. of Murray Hill, N.J., USA. CODEC 24 may be a programmable CODEC, such as the T8531/T8532 model CODEC, available from Agere Systems, Inc. of Allentown, Pa., USA.

In a conventional configuration, such as one shown in FIG. 1, CODEC 24 processes information received from tip/ring lines 20 via SLIC 22 and generates an impedance voltage level at ports VRN and VRP that can be used to synthesize the impedance between tip/ring lines 20. SLIC 22 then generates a differential voltage at ports PT and PR based on the impedance voltage from CODEC 24, thereby synthesizing an impedance on tip/ring lines 20 through LPF 32. However, with the addition of transformer 26 and ADSL circuitry 30 as illustrated in FIG. 2, the synthesized impedance of SLIC 22 and blocking capacitor 28 become coupled to tip/ring lines 20 effectively in parallel. In the upper POTS frequency band, the frequency-dependent impedance of blocking capacitor 28 may cause the combined impedance to deviate from the Telcordia Standard. Referring back to FIG. 3, IWC 302 present between CODEC 24 and SLIC 22 of interface circuit 300 serves to alter the impedance voltage generated by CODEC 24 in such a way that the synthesized impedance taken in parallel with blocking capacitor 28 complies with the Telcordia Standard.

Figure 4:
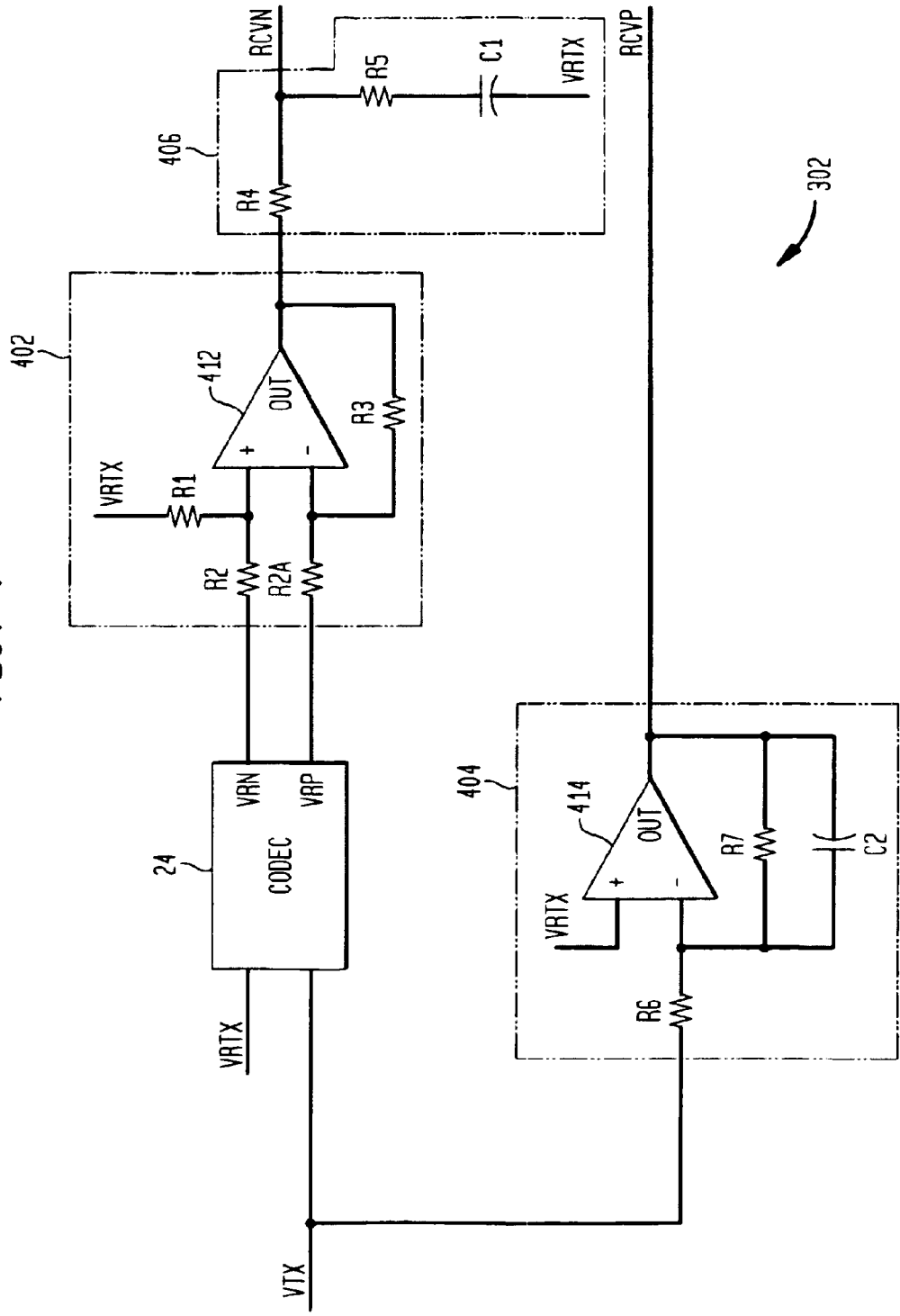
FIG. 4 is a schematic diagram of the impedance warping circuit that can be used in the interface circuit of FIG. 3 according to one embodiment of the present invention.

FIG. 4 shows a schematic diagram of IWC 302 according to one embodiment of the present invention. IWC 302 comprises amplifiers 402 and 404 and an optional output filter 406. Amplifier 402 converts the differential output of CODEC 24 into a first single-ended signal coupled to port RCVN of SLIC 22 via optional output filter 406. Amplifier 404 converts the differential output of SLIC 22 into a second single-ended signal that is coupled back to SLIC 22 at port RCVP. The first and second single-ended output signals of amplifiers 402 and 404 are used to generate a differential output signal of IWC 302 applied to SLIC 22 at ports RCVN and RCVP.

In one embodiment, amplifier 402 comprises a first operational amplifier 412 configured as an inverter using resistors R1, R2, R2A, and R3. The non-inverting and inverting inputs of amplifier 412 are connected to port VRN of CODEC 24 via resistor R2 and port VRP of CODEC 24 via resistor R2A, respectively. The non-inverting input of amplifier 412 is also connected to port VRTX of SLIC 22 via resistor R1. Resistor R3 connects the inverting input and the output of amplifier 412. Amplifier 404 comprises a second operational amplifier 414 configured as a frequency-dependent inverter. Amplifier 414 has resistor R7 in parallel with compensating capacitor C2 connected between its output and the inverting input. The non-inverting input of amplifier 414 is connected to port VRTX of SLIC 22. The inverting input of amplifier 414 is connected to port VTX of SLIC 22 via resistor R6. Optional output filter 406 comprises (i) resistor R4 connected between the output of amplifier 412 and port RCVN of SLIC 22 and (ii) resistor R5 and capacitor C1 in series connected between ports RCVN and VRTX of SLIC 22. Optional output filter 406 is preferably used with Sharc CODEC available from Agere Systems, Inc. of Allentown, Pa., USA.

Figure 5:
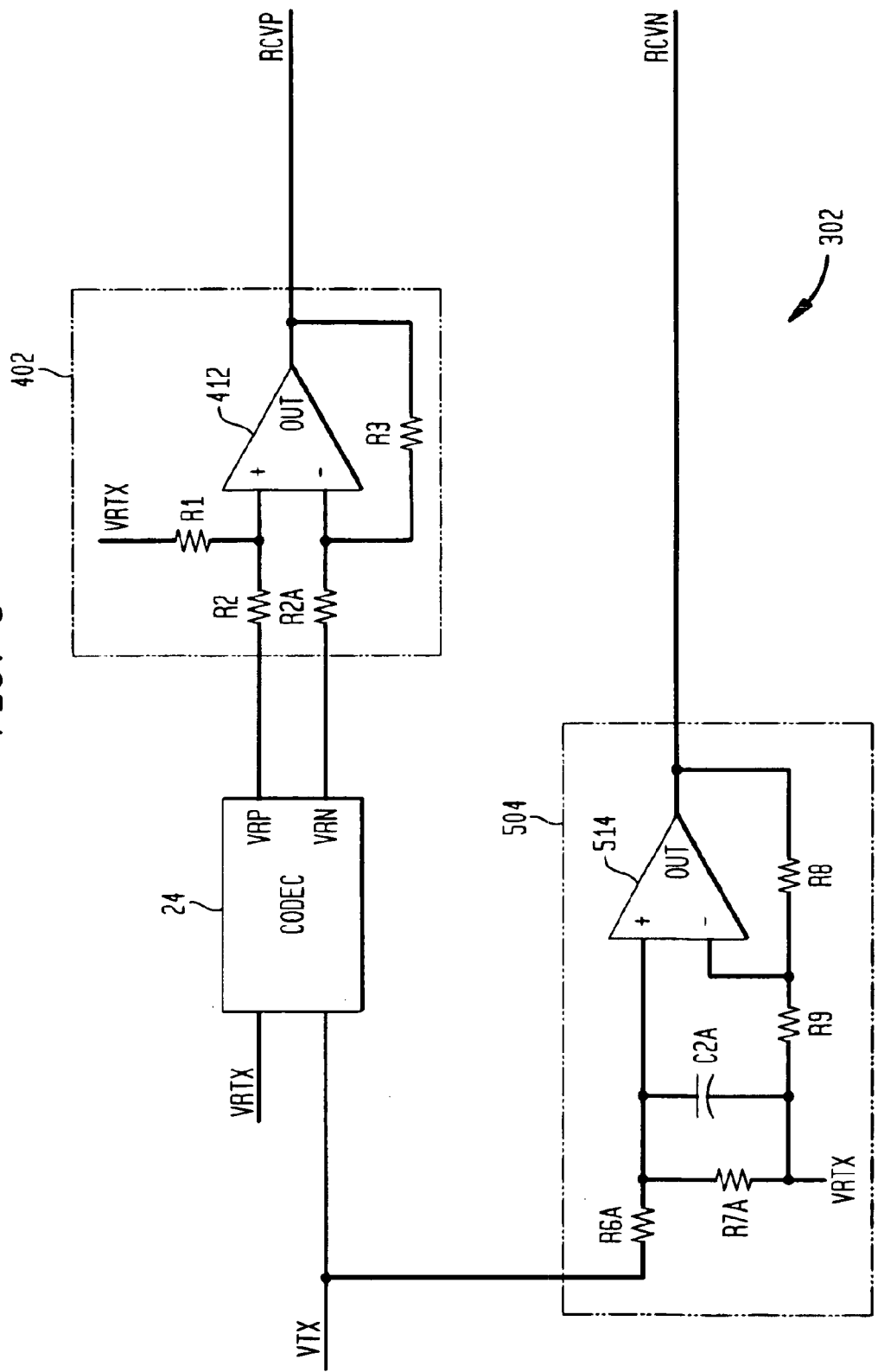
FIG. 5 is a schematic block diagram of the impedance warping circuit that can be used in the interface circuit of FIG. 3 according to another embodiment of the present invention.

FIG. 5 shows a schematic diagram of IWC 302 according to another embodiment of the present invention. As shown in FIG. 5, IWC 302 comprises amplifiers 402 and 504. Amplifier 402 and its operation have already been described in the context of FIG. 4. However, in the embodiment of FIG. 5, the polarity of connections of amplifier 402 to CODEC 24 and SLIC 22 is different from that of FIG. 4. In the embodiment of FIG. 5, the non-inverting and inverting inputs of amplifier 412 are now connected to port VRP of CODEC 24 via resistor R2 and port VRN of CODEC 24 via resistor R2A, respectively. Also, the single-ended output of amplifier 412 is now coupled to port RCVP of SLIC 22 instead of port RCVN as shown in FIG. 4. Similar to amplifier 404 of FIG. 4, amplifier 504 converts the differential output of SLIC 22 into a single-ended 120 output signal. However, the single-ended output signal of amplifier 504 is coupled to SLIC 22 at port RCVN instead of port RCVP for amplifier 404. The single-ended output signals of amplifiers 402 and 504 are used to generate a differential output signal of IWC 302 applied to SLIC 22 at ports RCVP and RCVN.

In one embodiment, amplifier 504 comprises an operational amplifier 514 configured as a frequency-dependent non-inverting buffer. Amplifier 514 has resistor R8 connected between its output and the inverting input. The inverting input of amplifier 514 is connected to port VRTX of SLIC 22 via resistor R9.

The non-inverting input of amplifier 514 is connected to port VTX of SLIC 22 via resistor R6A. The non-inverting input of amplifier 514 is also connected to port VRTX of SLIC 22 via resistor R7A and compensating capacitor C2A configured in parallel with each other.

Referring again to FIG. 4, the gain $K_1$ of amplifier 402 is set by resistors R2A and R3 and, therefore, is not frequency-dependent. In contrast, the gain $K_2$ of amplifier 404 is frequency-dependent and can be expressed by Eqn. (1) as follows:

$$K_2(\omega) = \frac{R_7}{R_6} \frac{1}{(1 + i\omega C_2 R_7)} \quad (1)$$

where $R_6$, $R_7$, and $C_2$ are resistances and capacitance of resistors R6 and R7 and compensating capacitor C2, respectively; $\omega=2\pi f$; and f is frequency. As can be seen from Eqn. (1), $K_2$ decreases as frequency of the applied signal, e.g., signal on tip/ring lines 20, increases. Because the output signals of amplifiers 402 and 404 are used differentially, the differential output signal of IWC 302 will increase with frequency by virtue of subtracting the decreasing frequency-dependent output signal of amplifier 404 from the frequency-independent output signal of amplifier 404.

The transfer function $T(\omega)$ of the combination of CODEC 24 and IWC 302 shown in FIG. 4 can be calculated as follows:

$$T(\omega)=K_0 K_1 - K_2(\omega) \quad (2)$$

where $K_0$ is the gain of CODEC 24. Combining Equations (1) and (2) and substituting $K_3$ for $R_7/R_6$ and $\omega_0^{-1}$ for $C_2 R_7$, respectively, one arrives at the following expression for the transfer function:

$$T(\omega) = K_0 K_1 - \frac{K_3}{1 + i\omega\omega_0^{-1}} \quad (3)$$

At relatively low frequencies, where $$\omega/\omega_0 << 1 \quad (4)$$

Eqn. (3) can be expanded into the following expression:

$$T(\omega) \approx (K_0 K_1 - K_3) + iK_3 \omega \omega_0^{-1} \quad (5)$$

Eqn. (5) describes the frequency-dependent transfer function of the combination of CODEC 24 and IWC 302 of interface circuit 300.

To illustrate how, using the transfer function expressed by Eqn. (5), the combination of CODEC 24 and IWC 302 can be configured to compensate the effect of blocking capacitor 28 on the impedance on tip/ring lines 20, let us consider the following. Suppose that one has an impedance Z, in parallel with a capacitor $C_{28}$ and needs the combined impedance of the two to be $Z_0=900\ \Omega+2.16\ \mu F$. Then $Z_0$ can be expressed as:

$$\frac{1}{Z_0} = \frac{1}{Z_1} + i\omega C_{28} \qquad (6)$$

and $Z_1$ can be calculated as:

$$Z_1 = \frac{Z_0}{(1 - i\omega C_{28} Z_0)} \qquad (7)$$

If $$|\omega C_{28} Z_0| \ll 1 \qquad (8)$$

e.g., relatively low frequencies and/or relatively small capacitor $C_{28}$, then Eqn. (7) can be expanded as follows:

$$Z_1 \approx Z_0(1 + i\omega C_{28} Z_0) \qquad (9)$$

Comparing Equations (5) and (9), one finds that they define analogous transfer functions, thereby enabling CODEC 24 and IWC 302 to compensate for the effect of blocking capacitor 28 and synthesize an impedance on tip/ring lines 20 that will comply with the Telcordia Standard essentially throughout the entire POTS-band frequency range.

In one embodiment of the present invention, nominal values of resistors R2A, R3, R6, R7 and capacitors C2 and C28 are chosen to hold Equations (5) and (9) to within approximately 10% of Equations (3) and (7), respectively, and to within approximately 10% of each other at frequencies in the upper POTS band, e.g., around 2 to 4 kHz. In a preferred embodiment of IWC 302, resistors R1, R2, R2A, R3, R6, R7 are about 10 k$\Omega$ each and compensating capacitor C2 is about 3.3 nF. These values are preferably used with CODEC 24 whose gain $K_0$ is set at about 2. In another embodiment of IWC 302, resistors R4 and R5 are about 10 and 5.5 k$\Omega$, respectively, and capacitor C1 is about 330 $\mu F$.

Figure 6:
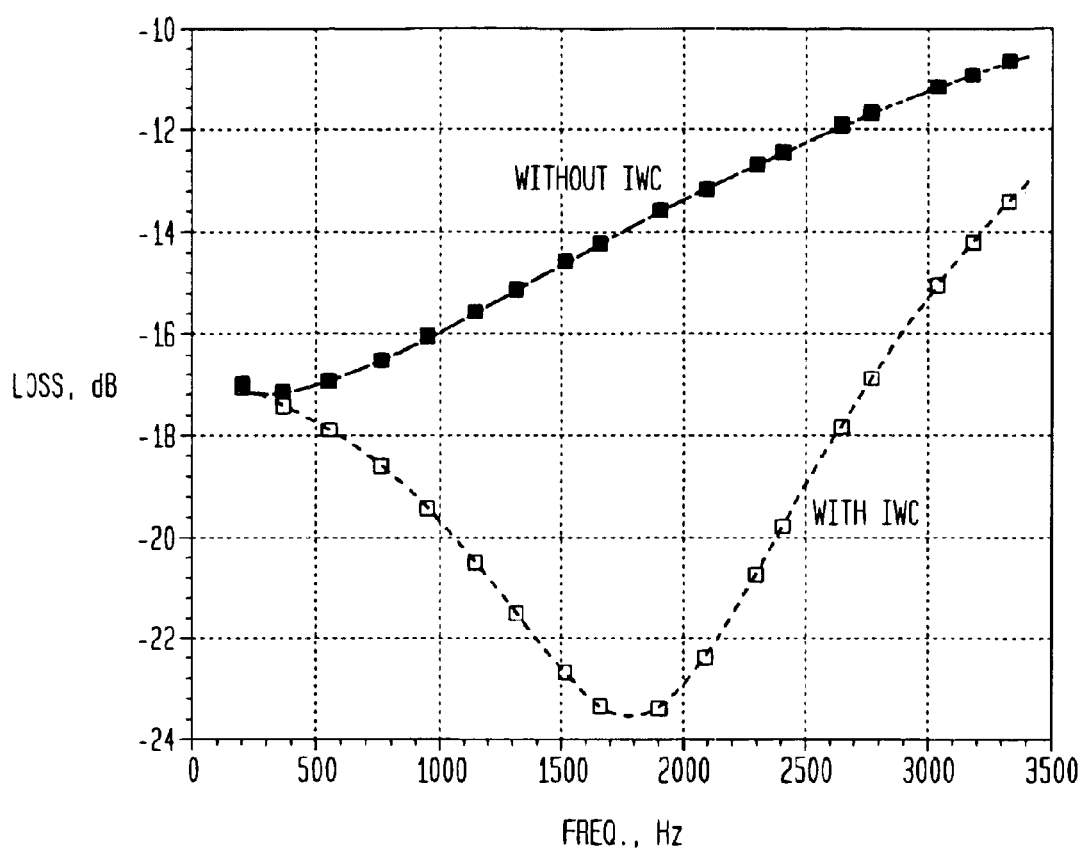
FIG. 6 is a graph illustrating a typical difference in two-wire return loss for interface circuits with and without the impedance warping circuit of FIG. 4.

FIG. 6 illustrates a typical difference in two-wire return loss observed for an interface circuit without an IWC (e.g., interface circuit 200 of FIG. 2) and an interface circuit with an IWC (e.g., interface circuit 300 of FIG. 3). In an ideal situation (not shown), when an interface circuit is perfectly matched to the tip/ring lines, the two-wire return loss is at minus infinity. Therefore, a relatively higher loss value (i.e., less negative) corresponds to a relatively larger impedance mismatch. In FIG. 6, solid squares correspond to the interface circuit without an IWC. The effect of the blocking capacitor (e.g., blocking capacitor 28) in the upper POTS band is seen as a relative increase of the loss and, therefore, impedance mismatch with frequency increase. Empty squares in FIG. 6 correspond to the interface circuit with an IWC. As can be seen in the frequency range of 1 to 3 kHz, incorporation of the IWC results in about 4-dB to about 9.5-dB reduction of the two-wire return loss and, thus, improves conformance of the synthesized impedance to the Telcordia standard.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims. Although the present invention has been described with reference to particular CODEC and SLIC models, it can also be used with different CODEC and SLIC models without departing from the principles set forth in this specification.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures.

What is claimed is:

1. An interface circuit for interfacing between a pair of subscriber tip/ring lines and a central office of a telecommunications network, the interface circuit comprising:

(a) filter circuitry configured to separate low-frequency and high-frequency signals appearing on the tip/ring lines, wherein the filter circuitry comprises a blocking capacitor that affects the low-frequency impedance of the tip/ring lines;

(b) high-frequency interface circuitry configured to process the high-frequency signals; and (c) low-frequency interface circuitry configured to process the low-frequency signals, wherein the low-frequency interface circuitry comprises:

(1) a subscriber line interface circuit (SLIC) configured between the tip and ring lines;

(2) a coder/decoder (CODEC) configured to encode and decode the low-frequency signals; and (3) an impedance warping circuit (IWC) configured between the SLIC and the CODEC, wherein:

the IWC has first, second, and third differential ports, each port different from the other ports;

the IWC is configured to receive a first differential signal from the SLIC at the first differential port and a second differential signal from the CODEC at the second differential port and generate a third differential signal provided to the SLIC at the third differential port; and the IWC tends to compensate for the effect of the blocking capacitor on the low-frequency impedance between the tip/ring lines.

2. The invention of claim 1, wherein the compensation provided by the IWC provides a desired impedance between the tip/ring lines for both the low-frequency and high-frequency signals.

3. The invention of claim 2, wherein the desired impedance has a resistance of about 900 ohms and a capacitance of about 2.16 microfarads.

4. The invention of claim 1, wherein:

the high-frequency signals correspond to DSL signals having frequencies greater than about 4 kHz;

the low-frequency signals correspond to POTS signals having frequencies less than about 4 kHz; and the filter circuitry comprises (i) a high-pass filter configured to provide the DSL signals to the high-frequency interface circuitry and (ii) a low-pass filter configured to provide the POTS signals to the low-frequency interface circuitry, wherein the blocking capacitor is part of the high-pass filter.

5. The invention of claim 1, wherein the IWC is configured to receive a first differential signal from the SLIC and a second differential signal from the CODEC and generate a third differential signal provided to the SLIC.

6. The invention of claim 5, wherein the IWC comprises:
(A) a first amplifier configured to generate a first single-ended output signal based on the second differential output signal; and
(B) a second amplifier configured to generate a second single-ended output signal based on the first differential output signal, wherein the first and second single-ended output signals are used to generate the third differential output signal.

7. The invention of claim 6, wherein:
the first amplifier comprises a first operational amplifier configured as an inverter; and
the second amplifier comprises a second operational amplifier configured as a frequency-dependent inverter, such that the third differential output signal increases when frequency of the low-frequency signals increases.

8. The invention of claim 7, wherein the second amplifier further comprises a resistor and a compensating capacitor configured in parallel between the inverting input and the output of the second operational amplifier.

9. The invention of claim 6, wherein the IWC further comprises an output filter configured to filter the first single-ended output signal generated by the first amplifier.

10. An impedance warping circuit (IWC) for an interface circuit for interfacing between a pair of subscriber tip/ring lines and a central office of a telecommunications network, the interface circuit comprising:
(a) filter circuitry configured to separate low-frequency and high-frequency signals appearing on the tip/ring lines, wherein the filter circuitry comprises a blocking capacitor that affects the low-frequency impedance of the tip/ring lines;
(b) high-frequency interface circuitry configured to process the high-frequency signals; and
(c) low-frequency interface circuitry configured to process the low-frequency signals, wherein the low-frequency interface circuitry comprises:
(1) a subscriber line interface circuit (SLIC) configured between the tip and ring lines;
(2) a coder/decoder (CODEC) configured to encode and decode the low-frequency signals; and
(3) the IWC configured between the SLIC and the CODEC, wherein:
the IWC has first, second, and third differential ports, each port different from the other ports:
the IWC is configured to receive a first differential signal from the SLIC at the first differential port and a second differential signal from the CODEC at the second differential port and venerate a third differential signal provided to the SLIC at the third differential port; and
the IWC tends to compensate for the effect of the blocking capacitor on the low-frequency impedance between the tip/ring lines.

11. The invention of claim 10, wherein the compensation provided by the IWC provides a desired impedance between the tip/ring lines for both the low-frequency and high-frequency signals.

12. The invention of claim 11, wherein the desired impedance has a resistance of about 900 ohms and about 2.16 microfarads.

13. The invention of claim 10, wherein:
the high-frequency signals correspond to DSL signals having frequencies greater than about 4 kHz;
the low-frequency signals correspond to POTS signals having frequencies less than about 4 kHz; and
the filter circuitry comprises (i) a high-pass filter configured to provide the DSL signals to the high-frequency interface circuitry and (ii) a low-pass filter configured to provide the POTS signals to the low-frequency interface circuitry, wherein the blocking capacitor is part of the high-pass filter.

14. The invention of claim 10, wherein the IWC is configured to receive a first differential signal from the SLIC and a second differential signal from the CODEC and generate a third differential signal provided to the SLIC.

15. The invention of claim 14, wherein the IWC comprises:
(A) a first amplifier configured to generate a first single-ended output signal based on the second differential output signal; and
(B) a second amplifier configured to generate a second single-ended output signal based on the first differential output signal, wherein the first and second single-ended output signals are used to generate the third differential output signal.

16. The invention of claim 15, wherein:
the first amplifier comprises a first operational amplifier configured as an inverter; and
the second amplifier comprises a second operational amplifier configured as a frequency-dependent inverter, such that the third differential output signal increases when frequency of the low-frequency signals increases.

17. The invention of claim 16, wherein the second amplifier further comprises a resistor and a compensating capacitor configured in parallel between the inverting input and the output of the second operational amplifier.

18. The invention of claim 15, wherein the IWC further comprises an output filter configured to filter the first single-ended output signal generated by the first amplifier.

19. The invention of claim 1, wherein:
the SLIC and the CODEC are adapted to synthesize a desired impedance between the tip and ring lines;
the blocking capacitor impedes the impedance synthesis by causing an effective impedance between the tip and ring lines to deviate from the desired impedance; and
the IWC is adapted to reduce the impedance deviation caused by the blocking capacitor.

20. The invention of claim 10, wherein:
the SLIC and the CODEC are adapted to synthesize a desired impedance between the tip and ring lines;
the blocking capacitor impedes the impedance synthesis by causing an effective impedance between the tip and ring lines to deviate from the desired impedance; and
the IWC is adapted to reduce the impedance deviation caused by the blocking capacitor.

21. An interface circuit for interfacing between a pair of subscriber tip/ring lines and a central office of a telecommunications network, the interface circuit comprising filter circuitry having a blocking capacitor, the filter circuitry adapted to separate low-frequency and high-frequency signals appearing on the tip/ring lines between low-frequency and high-frequency signal paths, the low-frequency path including:
(1) a subscriber line interface circuit (SLIC) configured between the tip and ring lines;
(2) a coder/decoder (CODEC) configured to encode and decode the low-frequency signals; and
(3) an impedance warping circuit (IWC) coupled between the SLIC and the CODEC, wherein:
the SLIC and the CODEC are adapted to synthesize a desired impedance between the tip and ring lines;

the blocking capacitor impedes the impedance synthesis by causing an effective impedance between the tip and ring lines to deviate from the desired impedance;

the IWC has first, second, and third differential ports, each port different from the other ports;

the IWC is configured to receive a first differential signal from the SLIC at the first differential port and a second differential signal from the CODEC at the second differential port and generate a third differential signal provided to the SLIC at the third differential port; and the IWC is adapted to reduce the impedance deviation caused by the blocking capacitor.

22. An impedance warping circuit (IWC) for an interface circuit for interfacing between a pair of subscriber tip/ring lines and a central office of a telecommunications network, the interface circuit comprising filter circuitry having a blocking capacitor, the filter circuitry adapted to separate low-frequency and high-frequency signals appearing on the tip/ring lines between low-frequency and high-frequency signal paths, the low-frequency path including:

(1) a subscriber line interface circuit (SLIC) configured between the tip and ring lines;

(2) a coder/decoder (CODEC) configured to encode and decode the low-frequency signals; and (3) an impedance warping circuit (IWC) coupled between the SLIC and the CODEC, wherein:

the SLIC and the CODEC are adapted to synthesize a desired impedance between the tip and ring lines;

the blocking capacitor impedes the impedance synthesis by causing an effective impedance between the tip and ring lines to deviate from the desired impedance;

the IWC has first, second, and third differential ports, each port different from the other ports;

the IWC is configured to receive a first differential signal from the SLIC at the first differential port and a second differential signal from the CODEC at the second differential port and generate a third differential signal provided to the SLIC at the third differential port; and the IWC is adapted to reduce the impedance deviation caused by the blocking capacitor.

* * * * *